(12) United States Patent
Tamura et al.

(10) Patent No.: US 12,421,697 B2
(45) Date of Patent: Sep. 23, 2025

(54) DISPLAY DEVICE AND WORK MACHINE COMPRISING SAME

(71) Applicant: Yanmar Holdings Co., Ltd., Osaka (JP)

(72) Inventors: Kazuki Tamura, Chikugo (JP); Shogo Suzuki, Chikugo (JP); Daisuke Kawaguchi, Chikugo (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 301 days.

(21) Appl. No.: 18/020,810

(22) PCT Filed: Aug. 11, 2021

(86) PCT No.: PCT/JP2021/029595
§ 371 (c)(1),
(2) Date: Feb. 10, 2023

(87) PCT Pub. No.: WO2022/034894
PCT Pub. Date: Feb. 17, 2022

(65) Prior Publication Data
US 2024/0035258 A1 Feb. 1, 2024

(30) Foreign Application Priority Data
Aug. 11, 2020 (JP) ................. 2020-135800

(51) Int. Cl.
*E02F 9/26* (2006.01)
*E02F 3/32* (2006.01)
*E02F 9/24* (2006.01)

(52) U.S. Cl.
CPC ............. *E02F 9/267* (2013.01); *E02F 3/325* (2013.01); *E02F 9/24* (2013.01)

(58) Field of Classification Search
CPC .. E02F 3/325; E02F 9/24; E02F 9/267; G05B 23/0272
See application file for complete search history.

(56) References Cited

U.S. PATENT DOCUMENTS 7,342,486 B2 * 3/2008 Tsukada .................... E02F 9/26
348/148
7,817,021 B2 * 10/2010 Date ......................... B60R 1/26
348/148

(Continued)

FOREIGN PATENT DOCUMENTS

EP 3029536 A1 6/2016
JP 03-228929 A 10/1991

(Continued)

OTHER PUBLICATIONS

Japanese Office Action dated Sep. 5, 2023 issued in JP Application No. 2020135800.

(Continued)

*Primary Examiner* — Tyler J Lee
(74) *Attorney, Agent, or Firm* — NORTON ROSE FULBRIGHT US LLP

(57) ABSTRACT

A display device includes a display unit; a control unit; an alarm sound output unit; and a reception unit. When the display unit displays a second screen, the control unit assigns, to the reception unit, a function of receiving an output stop instruction that indicates an instruction to stop the output of an alarm sound, and a function of receiving a second instruction that indicates an instruction to transition to a first screen. When the reception unit receives the output stop instruction, the control unit stops the output of the alarm sound. When the reception unit receives the second instruction after having received the output stop instruction, the control unit causes the display unit to display the first screen (Continued)

and causes the alarm sound output unit to output the alarm sound.

16 Claims, 11 Drawing Sheets

(56) References Cited

U.S. PATENT DOCUMENTS

| | | | |
|---|---|---|---|
| 9,587,380 B2 * | 3/2017 | Matsumoto | E02F 9/261 |
| 2009/0009308 A1 * | 1/2009 | Date | B60R 1/26 |
| | | | 340/439 |
| 2013/0063262 A1 | 3/2013 | Shaikh et al. | |
| 2016/0117059 A1 * | 4/2016 | Folken | G06Q 10/0631 |
| | | | 715/738 |
| 2016/0265196 A1 | 9/2016 | Shimizu | |
| 2017/0255192 A1 | 9/2017 | Thwaites et al. | |

FOREIGN PATENT DOCUMENTS

| | | |
|---|---|---|
| JP | H03-228929 A | 10/1991 |
| JP | H05-260605 A | 10/1993 |
| JP | 2006256466 A | 9/2006 |
| JP | 2014026532 A | 2/2014 |
| JP | 2019-517703 A | 6/2019 |
| WO | 2016-016978 A1 | 2/2016 |

OTHER PUBLICATIONS

International Search Report dated Oct. 26, 2021 issued in corresponding PCT Application PCT/JP2021/029595.
Extended European Search Report dated Sep. 26, 2024 issued in EP Application No. 21855973.0.
Japanese Office Action dated Feb. 6, 2024 issued in JP Application No. 2020-135800.

* cited by examiner

DISPLAY DEVICE AND WORK MACHINE COMPRISING SAME

CROSS-REFERENCE TO RELATED APPLICATIONS

This application is a national stage application pursuant to 35 U.S.C. § 371 of International Application No. PCT/JP2021/029595, filed on Aug. 11, 2021, which claims priority under 35 U.S.C. § 119 to Japanese Patent Application No. 2020-135800 filed on Aug. 11, 2020, the disclosures of which are hereby incorporated by reference in their entireties.

TECHNICAL FIELD

The present invention relates to a display device and a work machine provided with the same.

BACKGROUND ART

A display device that, at the time of occurrence of an error, causes an alarm sound output unit to output an alarm sound is known. For example, Patent Literature 1 discloses a work vehicle provided with a display device that controls an alarm buzzer. Specifically, the display device is provided with a plurality of operation switches, and a display unit. The display device, at the time of occurrence of an abnormality, causes an alarm buzzer to sound. Also, the display device determines whether or not a buzzer cancel function is enabled for the abnormality that has occurred. When the abnormality for which the buzzer cancel function is enabled occurs, the display device assigns the buzzer cancel function to one of the plural operation switches and displays a buzzer cancel icon at a display position that corresponds to that operation switch. When the worker presses down the operation switch to which the buzzer cancel function is assigned, the display device causes the alarm buzzer to stop sounding. Meanwhile, when the abnormality for which the buzzer cancel function is not enabled occurs, the display device leaves the alarm buzzer sounding.

CITATION LIST

Patent Literature

Patent Literature 1: PCL International Publication No. WO 2016/016978

DISCLOSURE OF INVENTION

Problems to be Solved by the Invention

However, when the abnormality (error) for which the buzzer cancel function is not enabled occurs, the display device of Patent Literature 1 cannot stop the alarm buzzer. Thus, the alarm sound, as the case may be, is being output even when a service staff is to inspect or repair an abnormal place, and the service staff's work may be disturbed by the alarm sound.

In view of the above issue, the present invention has been made, and it is an object of the present invention to provide a display device capable of stopping output of an alarm sound regardless of the type of error, and a work machine provided with the same.

Means for Solving the Problems

A display device according to the present invention includes a display unit, a control unit that, an alarm sound output unit, and a reception unit. The display unit displays a first screen. The control unit, based on alarm information, causes the first screen to display an image that shows that an error is occurring. The alarm sound output unit outputs an alarm sound based on the alarm information. The reception unit receives a first instruction that indicates a transition to a second screen that shows a content of the error. The control unit, when the reception unit receives the first instruction, causes the display unit to display the second screen. The control unit, with the display unit displaying the second screen, assigns, to the reception unit, a function of receiving an output stop instruction that indicates an instruction to stop the alarm sound's output and a function of receiving a second instruction that indicates an instruction of a transition from the second screen to the first screen. The control unit, with the reception unit receiving the output stop instruction, stops the alarm sound's output by the alarm sound output unit. The control unit, when the reception unit receives the second instruction after having received the output stop instruction, causes the display unit to display the first screen, and causes the alarm sound output unit to output the alarm sound.

Effect of the Invention

According to the present invention, output of an alarm sound can be stopped regardless of the type of error.

DESCRIPTION OF EMBODIMENTS

Figure 1:
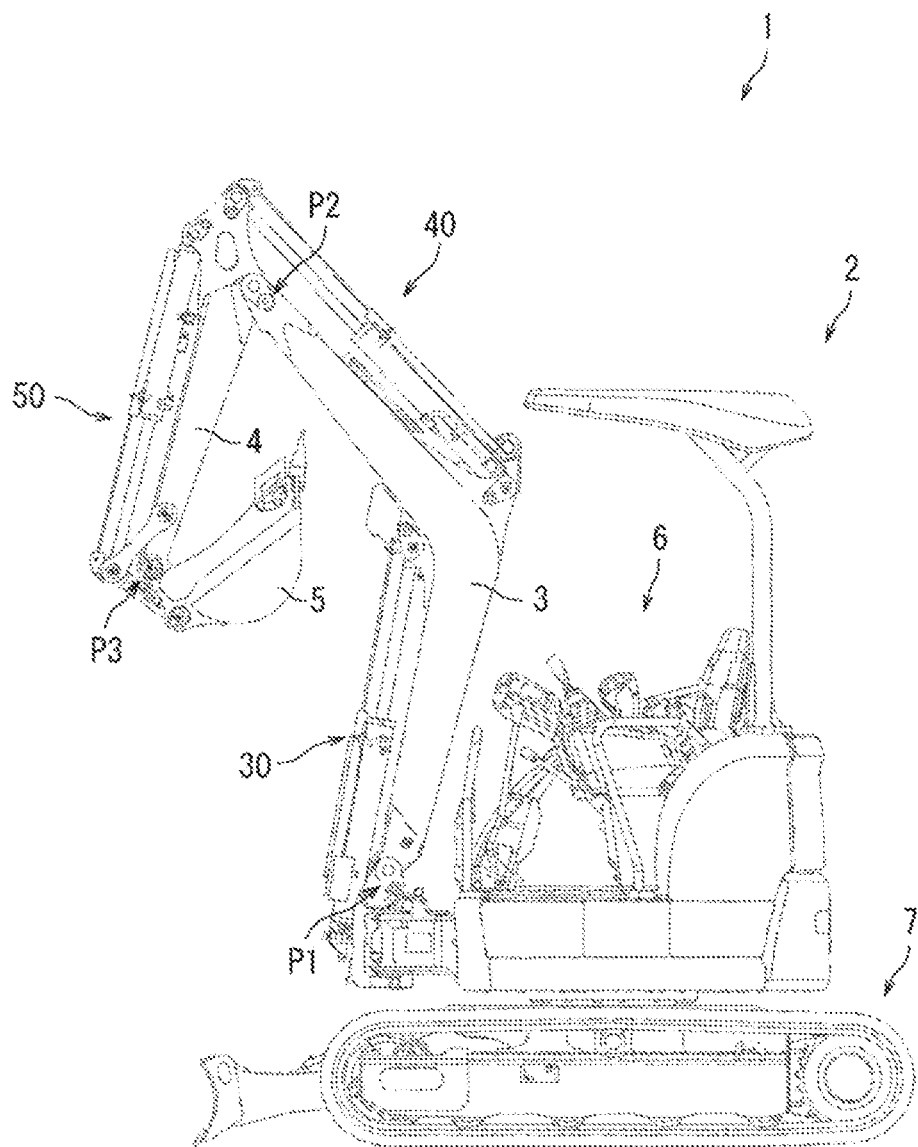
FIG. 1 is a side view of a work machine according to an embodiment of the present invention.

The following is a description of an embodiment according to a display device and work machine of the present invention with reference to the drawings (FIGS. 1 to 11). Note that the present invention is not limited to the embodiment below. Any duplicated explanation is, as the case may be, properly omitted. Note that, in the drawings, the same reference signs are used for the same or equivalent components, and repeated descriptions are to be omitted.

First, a work machine 1 of the present embodiment is to be described with reference to FIGS. 1 to 3. FIG. 1 shows a side view of the work machine 1 of the present embodiment. As shown in FIG. 1, the work machine 1 is a backhoe. The backhoe is a type of construction machine. The work machine 1 of the present embodiment has a machine body 2, a boom 3, an arm 4, a bucket 5, and a run device 7. The work machine 1 of the present embodiment is further provided with a boom actuator 30, an arm actuator 40, and an attachment actuator 50.

The machine body 2 has a driver seat 6. A worker sits on the driver seat 6 and operates the work machine 1. The machine body 2 is supported by the run device 7. The machine body 2 may be swingably supported by the run device 7. The machine body 2 is provided with an engine 12 (see FIG. 3), a fuel tank, a battery, a hydraulic system, and a hydraulic oil tank. Also, the machine body 2 has a hood that houses the engine 12 (see FIG. 3), the fuel tank, the battery, the hydraulic system, and the hydraulic oil tank, and the driver seat 6 is placed on the hood.

The boom 3 is so supported by the machine body 2 as to swing around a first rotation supporting point P1. Specifically, a base end portion of the boom 3 is axially supported by the machine body 2. The first rotation supporting point P1 is a rotary axis that extends along the right/left direction that is observed when the driver seat 6 is viewed from the front. Hereafter, the right/left direction that is observed when the driver seat 6 is viewed from the front, as the case may be, is described as the "right/left direction".

The boom actuator 30 actuates the boom 3. Specifically, the boom actuator 30, by extending and retracting, swings the boom 3 around the first rotation supporting point P1. In detail, controlling the hydraulic oil supplied to the boom actuator 30 and the hydraulic oil discharged from the boom actuator 30 extends and retracts the boom actuator 30. Thus, the boom actuator 30 is extended and retracted by the hydraulic oil.

The arm 4 is so supported by the boom 3 as to swing around a second rotation supporting point P2. Specifically, a base end portion of the arm 4 is axially supported at a tip portion of the boom 3. The second rotation supporting point P2 is a rotary axis extending along the right/left direction.

The arm actuator 40 actuates the arm 4. Specifically, the arm actuator 40, by extending and retracting, swings the arm 4 around the second rotation supporting point P2. In detail, controlling the hydraulic oil supplied to the arm actuator 40 and the hydraulic oil discharged from the arm actuator 40 extends and retracts the arm actuator 40. Thus, the arm actuator 40 is extended and retracted by the hydraulic oil.

The bucket 5 is a type of attachment. The bucket 5 is so supported by the arm 4 as to swing around a third rotation supporting point P3. Specifically, the bucket 5 is axially supported at a tip portion of the arm 4. The third rotation supporting point P3 is a rotary axis extending along the right/left direction.

The attachment actuator 50 actuates the bucket 5. Specifically, the attachment actuator 50, by extending and retracting, swings the bucket 5 around the third rotation supporting point P3. In detail, controlling the hydraulic oil supplied to the attachment actuator 50 and the hydraulic oil discharged from the attachment actuator 50 extends and retracts the actuator 50. Thus, the attachment actuator 50 is extended and retracted by the hydraulic oil.

The run device 7 causes the work machine 1 to run. In the present embodiment, the run device 7 is a crawler-type run device.

Figure 2:
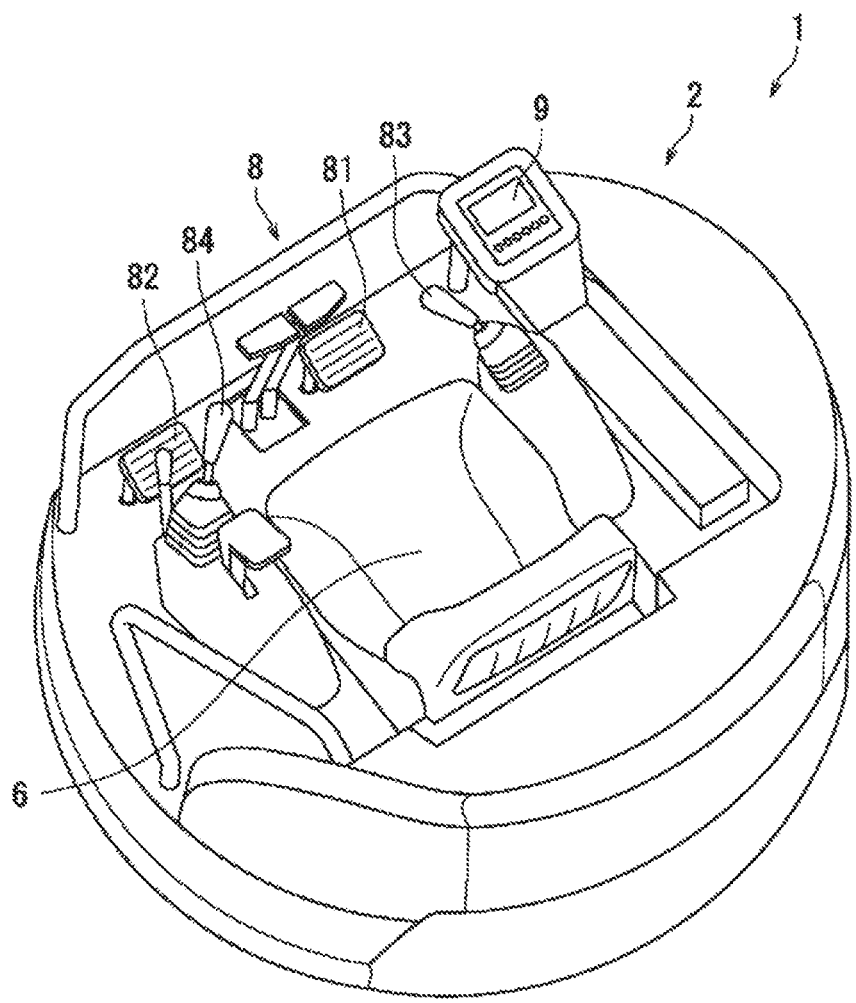
FIG. 2 is a perspective view of a machine body in the work machine.
Figure 3:
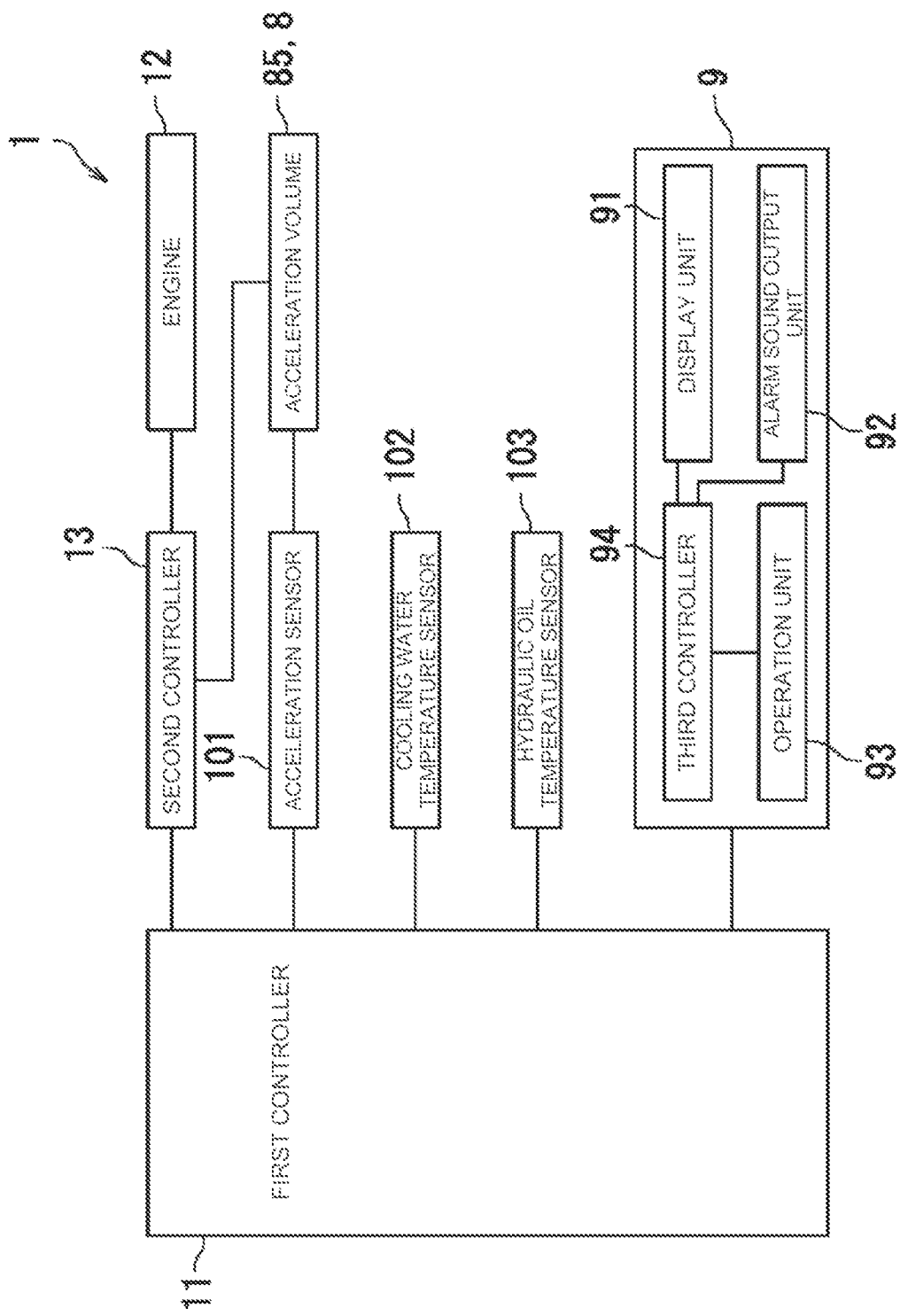
FIG. 3 is a block diagram of the work machine.

Then, referring to FIGS. 1 and 2, the configuration of the work machine 1 is described in more detail. Specifically, the configuration around the driver seat 6 is to be described. FIG. 2 is a perspective view of the machine body 2 in the work machine 1.

As shown in FIG. 2, the work machine 1 is further provided with a steering unit 8 and a display device 9. The steering unit 8 and the display device 9 are installed on the machine body 2. Specifically, the steering unit 8 and the display device 9 are placed in front of the driver seat 6.

The steering unit 8 includes various operation members for the worker to steer the work machine 1. The various operation members include a swing pedal 81, a PTO pedal 82, a boom operation lever 83, and an arm operation lever 84.

The swing pedal 81 is a foot pedal. The worker operates the swing pedal 81 with his or her foot. The worker operates the swing pedal 81, making it possible to rotate, by means of a swing cylinder, the boom 3 to the left and right via a swing bracket.

The PTO pedal 82 is a foot pedal. The worker operates the PTO pedal 82 with his/her foot. The worker operates the PTO pedal 82, making it possible to drive an attachment attached to a PTO port.

The worker manually operates the boom operation lever 83 and the arm operation lever 84. The worker operates the boom operation lever 83, making it possible to operate the boom 3. Also, the worker operates the arm operation lever 84, making it possible to operate the arm 4.

The display device 9 displays various screens. For details, as described below with reference to FIGS. 4 to 6, etc., the display device 9 displays a home screen 510. Also, as described below with reference to FIG. 7, etc., the display device 9 displays an error information screen 520. Also, as described below with reference to FIG. 8, etc., the display device 9 displays an error information detail screen 530.

Then, the configuration of the work machine 1 of the present embodiment is further described with reference to FIGS. 1 to 3. FIG. 3 shows a block diagram of the work machine 1. As shown in FIG. 3, the work machine 1 is further provided with a first controller 11, the engine 12, and a second controller 13. Also, the work machine 1 is provided with various sensors. In the present embodiment, the work machine 1 is provided with an acceleration sensor 101, a cooling water temperature sensor 102, and a hydraulic oil temperature sensor 103. Also, the steering unit 8 further includes an acceleration volume 85.

The engine 12 generates a drive force that drives the run device 7. The second controller 13 controls the engine 12 based on a command sent from the first controller 11.

The second controller 13 includes, for example, a processing unit that executes various processes, a storage unit that stores various programs and various data, and an input/output interface. The processing unit includes, for example, a processor, which executes various calculations, such as CPU (Central Processing Unit) or MPU (Micro Processing Unit). Or, the processing unit may be composed of a general-purpose calculator. The storage unit includes, for example, a semiconductor memory. The storage unit includes a RAM (Random Access Memory) and a ROM (Read Only Memory), for example. The storage unit may further include non-volatile memories such as an EEPROM (registered trademark) or a flash memory. The second controller 13 includes, for example, an ECU (Electronic Control Unit).

The worker manually operates the acceleration volume 85. The acceleration volume 85 is electrically connected to the second controller 13. The worker operates the acceleration volume 85 forward or reverse, thus increasing or decreasing the engine 12's rpm.

The acceleration sensor 101 detects an operation position (rotational position) of the acceleration volume 85. To the second controller 13, the first controller 11 sends a command that controls the amount and timing of fuel injection into the engine 12 based on the acceleration volume 85's operation position detected by the acceleration sensor 101.

Further, the first controller 11 determines whether or not the acceleration volume 85's operation position detected by the acceleration sensor 101 shows an abnormal value (outlier). By comparing the acceleration volume 85's operation position detected by the acceleration sensor 101 with a threshold value, for example, the first controller 11 may determine whether or not the acceleration volume 85's operation position detected by the acceleration sensor 101 shows the abnormal value (outlier).

The cooling water temperature sensor 102 detects the temperature of the cooling water circulating in the engine 12. The first controller 11 determines whether or the cooling water's temperature detected by the cooling water temperature sensor 102 shows an abnormal value (outlier). By comparing the cooling water's temperature detected by the cooling water temperature sensor 102 with a threshold value, for example, the first controller 11 may determine whether or the cooling water's temperature detected by the cooling water temperature sensor 102 shows the abnormal value (outlier).

The hydraulic oil temperature sensor 103 detects the hydraulic oil's temperature. The first controller 11 determines whether or not the hydraulic oil's temperature detected by the hydraulic oil temperature sensor 103 shows an abnormal value (outlier). By comparing the hydraulic oil's temperature detected by the hydraulic oil temperature sensor 103 with a threshold value, for example, the first controller 11 may determine whether or not the hydraulic oil's temperature detected by the hydraulic oil temperature sensor 103 shows the abnormal value (outlier).

The first controller 11 controls various portions of the work machine 1. The first controller 11 includes, for example, a processing unit that executes various processes, a storage unit that stores various programs and various data, and an input/output interface. The first controller 11 is composed of, for example, an ECU.

When detecting that an error has occurred to the work machine 1, the first controller 11 sends alarm information to the display device 9. The alarm information shows that the error is occurring to the work machine 1. In detail, the alarm information includes information that shows an error name, an error code, and an alarm level. Also, the alarm information includes information that shows a method of dealing with the error. The error name, the error code, the alarm level, and the method of dealing with errors are preset for each error that is expected to occur to the work machine 1. In the present embodiment, the first controller 11 is an example of a sending unit.

Specifically, when determining that the accelerator volume 85's operation position detected by the acceleration sensor 101 shows the abnormal value (outlier), the first controller 11 sends the alarm information to the display device 9. Similarly, when determining that the cooling water's temperature detected by the cooling water temperature sensor 102 shows the abnormal value (outlier), the first controller 11 sends the alarm information to the display device 9. Further, when determining that the hydraulic oil's temperature detected by the hydraulic oil temperature sensor 103 shows the abnormal value (outlier), the first controller 11 sends the alarm information to the display device 9.

The display device 9 has a display unit 91, an alarm sound output unit 92, an operation unit 93, and a third controller 94.

The display unit 91 is composed of a display, such as a liquid crystal display or an organic EL display. Based on the alarm information, the display unit 91 displays an image that shows that the error is occurring. Specifically, based on the alarm information, the third controller 94 causes the display unit 91 to display the image that shows that the error is occurring.

The alarm sound output unit 92 outputs an alarm sound based on the alarm information. Specifically, based on the alarm information, the third controller 94 causes the alarm sound output unit 92 to output the alarm sound. That is, when the error occurs to the work machine 1, the alarm sound output unit 92 outputs the alarm sound. Thus, the worker can aurally recognize that the error is occurring to the work machine 1. The alarm sound output unit 92 is, for example, a buzzer.

The third controller 94 may cause the alarm sound output unit 92 to output the alarm sound that is different according to the alarm level. Specifically, in the present embodiment, the alarm levels include a first alarm level and a second alarm level. For example, when the first alarm level error is occurring to the work machine 1, the third controller 94 may cause the alarm sound output unit 92 to output a continuous sound. When only the second alarm level error is occurring to the work machine 1, the third controller 94 may cause the alarm sound output unit 92 to output an intermittent sound. With the alarm sound output unit 92 outputting the alarm sound that is different according to the alarm level, the worker can aurally recognize the alarm level of the error occurring to the work machine 1.

The operation unit 93 is operated by the worker, thereby to receive various instructions. The worker operates the operation unit 93, making it possible to input various instructions to the third controller 94. The operation unit 93 is an example of a reception unit. The operation unit 93, for example, receives an instruction to stop the output of alarm the sound.

Based on various information sent from the first controller 11, the third controller 94 causes the display unit 91 to display various screens. The third controller 94 includes, for example, a processing unit that executes various processes, a storage unit that stores various programs and various data, and an input/output interface. The third controller 94 is composed of, for example, an ECU. The third controller 94 is an example of a control unit.

Figure 4:
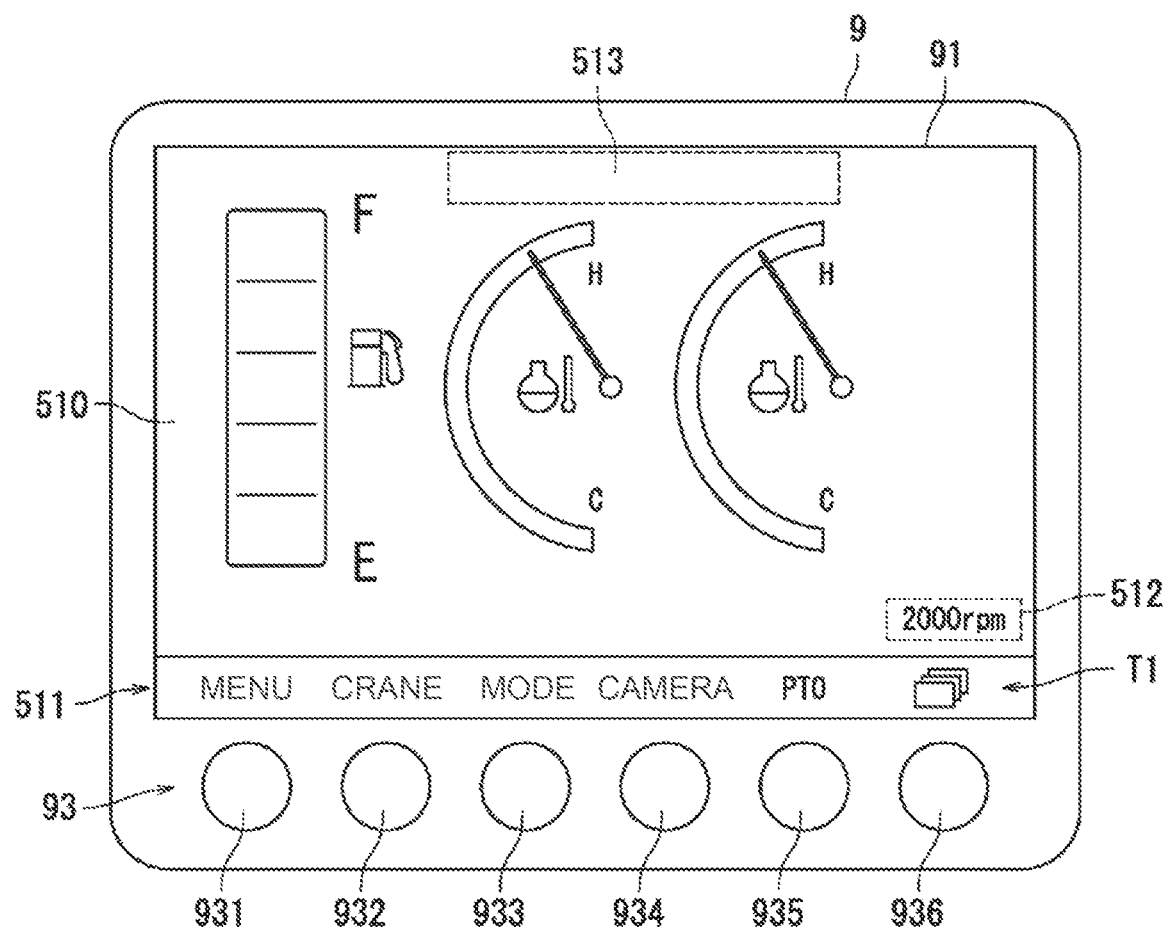
FIG. 4 is a diagram showing a display device according to the embodiment of the present invention.

Then, the display device 9 is to be further described with reference to FIGS. 1 to 10. FIG. 4 is a diagram showing the display device 9 of the present embodiment. In detail, FIG. 4 shows the display device 9 displaying the home screen 510. The home screen 510 is an example of a first screen. The home screen 510 displays, for example, a remaining fuel level gauge, a cooling water temperature gauge, and a hydraulic oil temperature gauge.

As shown in FIG. 4, the home screen 510 has a first selection item display area 511 and a first notification area 512. The first selection item display area 511 displays various selection items. Specifically, the first selection item display area 511 displays letter images (letter string images) or marks showing various selection items. Marks are, for example, an icon, shape, or a pictogram.

In the present embodiment, the operation unit 93 includes a plurality of operation switches. Specifically, the operation unit 93 includes a first operation switch 931 to a sixth operation switch 936. The first operation switch 931 to the sixth operation switch 936 each correspond one of the selection items displayed in the first selection item display area 511. When the display unit 91 is displaying the home screen 510, the first operation switch 931 to the sixth operation switch 936 are each assigned a function of selecting one of the selection items displayed in the first selection item display area 511. That is, the first operation switch 931 to the sixth operation switch 936 each receive an instruction for selecting the corresponding item.

For example, the sixth operation switch 936 is assigned the function of selecting a selection item T1. The selection item T1 is an item for switching the information displayed in the first notification area 512. For example, each time the worker presses down the sixth operation switch 936, the third controller 94 switches the information, which is displayed in the first notification area 512, between information that shows the engine 12's RPM and information that shows the remaining fuel level.

The home screen 510 further has a second notification area 513. When the first controller 11 detects the occurrence of the error, the third controller 94 causes the second notification area 513 to display an error notification image 610 and an alarm mark image 620 which are to be described with reference to FIG. 5, etc. FIG. 4 shows the home screen 510 that is displayed at the display unit 91 when the first controller 11 has not detected the occurrence of the error. Thus, the error notification image 610 and the alarm mark image 620 are not displayed in the second notification area 513. In the following description, the second notification area 513, as the case may be, is described as "error notification area 513".

Figure 5:
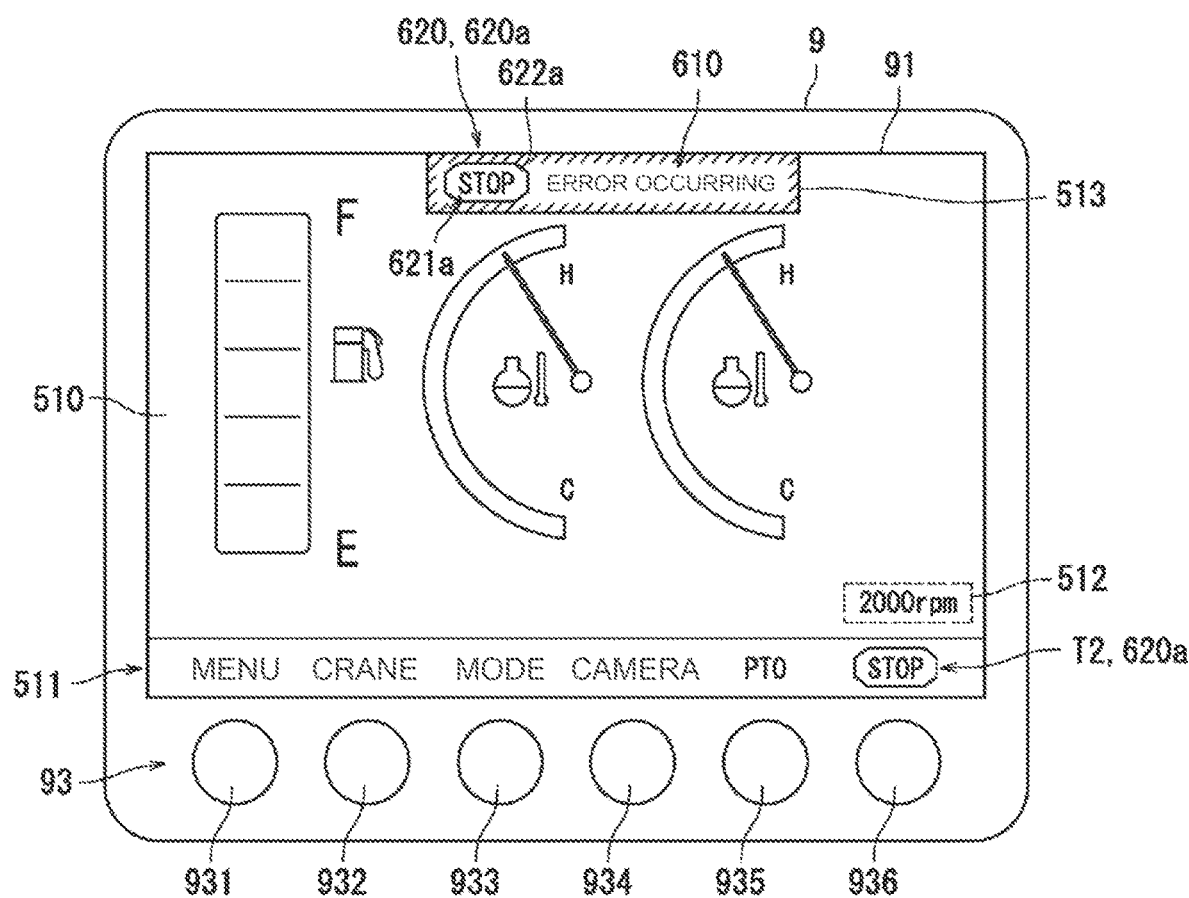
FIG. 5 is a diagram showing the display device displaying an error notification image and an alarm mark image.

Then, the display device 9 is further described with reference to FIGS. 1 to 5. FIG. 5 is a diagram showing the display device 9 displaying the error notification image 610 and the alarm mark image 620.

As shown in FIG. 5, based on the alarm information, the third controller 94 causes the home screen 510 to display the error notification image 610 and the alarm mark image 620. Thus, the worker can visually recognize that the error is occurring to the work machine 1.

In detail, the third controller 94 causes the error notification area 513 to display the error notification image 610 and the alarm mark image 620. The error notification image 610 and the alarm mark image 620 are each an example of an image that shows that the error is occurring. The error notification image 610 is a letter string image that shows that the error is occurring. The alarm mark image 620 is a mark image that shows that the error is occurring. Specifically, the alarm mark image 620 shows the alarm level.

As described with reference to FIG. 3, in the present embodiment, the alarm levels include the first alarm level and the second alarm level. The first alarm level is set for the error due to which the work machine 1 needs to be stopped. The second alarm level is set for the error due to which the work machine 1 does not need to be stopped. Thus, when only the second alarm level error is occurring, the worker may continue the work by the work machine 1.

FIG. 5 shows the alarm mark image 620 that corresponds to the first alarm level. Hereinafter, the alarm mark image 620 that corresponds to the first alarm level is referred to as "first alarm mark image 620*a*". When at least one first alarm level error is occurring to the work machine 1, the third controller 94 causes the error notification area 513 to display the first alarm mark image 620*a*. Thus, with the first alarm mark image 620*a* displayed on the home screen 510 (error notification area 513), the worker can visually recognize that the first alarm level error is occurring to the work machine 1.

Based on the alarm level, the third controller 94 determines a background color of the error notification area 513. In other words, the third controller 94 changes the background color of the error notification area 513 according to the alarm level. Specifically, when the first alarm level error is occurring, the background color of the error notification area 513 is determined to be "red". Thus, from the background color of the error notification area 513, the worker can visually recognize that the first alarm level error is occurring to the work machine 1.

Further, the first alarm mark image 620*a* includes a letter string image 621*a* and a graphic image 622*a*. The letter string image 621*a* is placed inside the graphic image 622*a*. The graphic image 622*a*'s outline and the letter string image 621*a* are white, and a color (background color) inside the graphic image 622*a* is red.

Then, the display device 9 is further described with reference to FIGS. 1 to 5. As shown in FIG. 5, based on the alarm information, the third controller 94 causes the first selection item display area 511 to display a selection item T2. The selection item T2 is an item that is selected when the screen to be displayed at the display unit 91 is caused to transition from the home screen 510 to the error information screen 520 to be described with reference to FIG. 7. With the selection item T2 displayed in the first selection item display area 511, the operation unit 93 can receive an instruction for transition to the error information screen 520.

In detail, with the selection item T2 displayed in the first selection item display area 511, the function of selecting the selection item T2 is assigned to one of the first operation switch 931 to the sixth operation switch 936. In the present embodiment, the selection item T2 is displayed in place of the selection item T1 described with reference to FIG. 4. Thus, the function of selecting the selection item T2 is assigned to the sixth operation switch 936.

Further, in the present embodiment, the alarm mark image 620 is displayed as the selection item T2. In the example shown in FIG. 5, the alarm mark image 620 is the first alarm mark image 620*a*. Thus, displaying the alarm mark image 620 as the selection item T2 causes the worker to more easily recognize the operation switch for transitioning to the error information screen 520. Further, displaying the first alarm mark image 620*a* as the selection item T2 causes the worker to visually recognize that the first alarm level error is occurring to the work machine 1.

Figure 6:
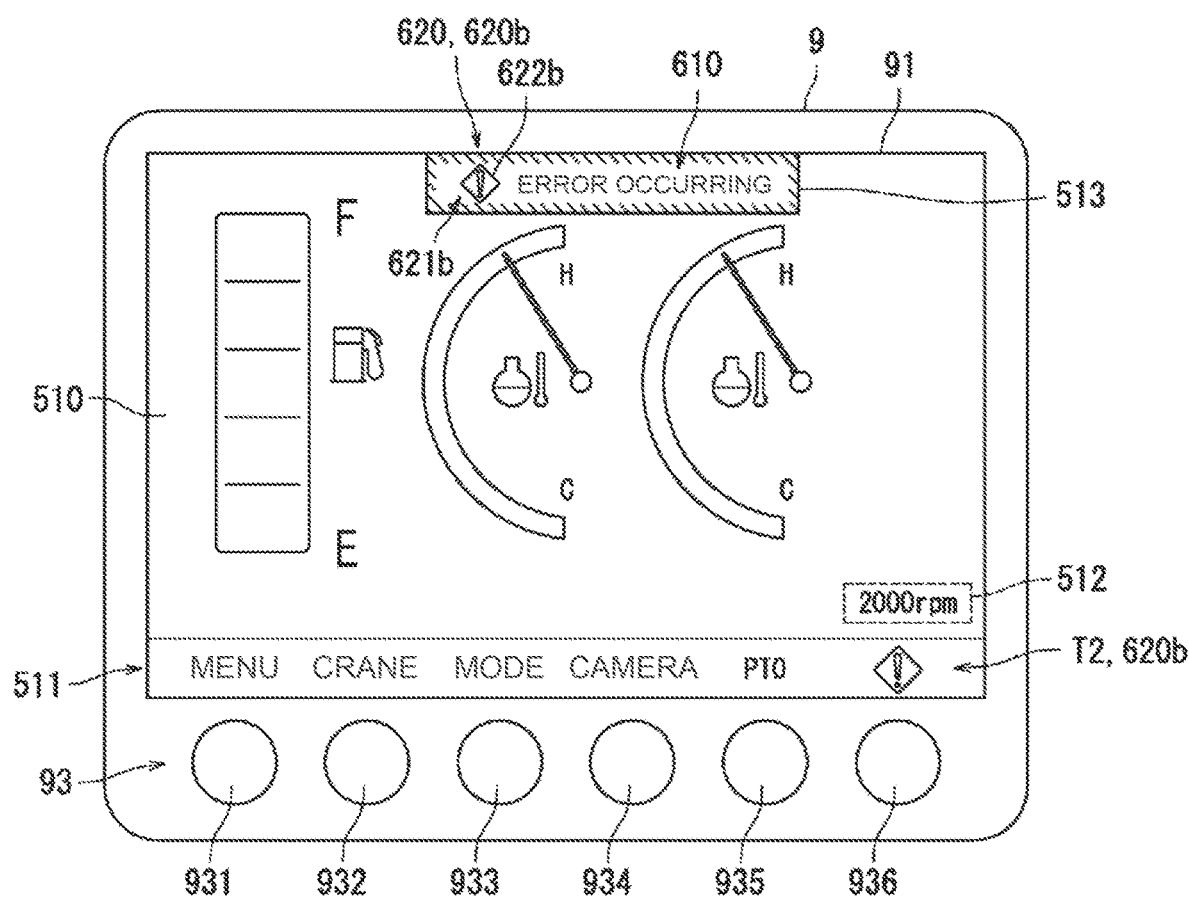
FIG. 6 is a diagram showing a home screen displayed on the display device when only a second alarm level error is occurring.

Then, the display device 9 is to be further described with reference to FIGS. 1 to 6. FIG. 6 is a diagram showing the home screen 510 that is displayed on the display device 9 when only the second alarm level error is occurring.

As shown in FIG. 6, when only the second alarm level error is occurring, the third controller 94 causes the error notification area 513 to display the alarm mark image 620 that corresponds to the second alarm level.

Hereinafter, the alarm mark image 620 that corresponds to the second alarm level is referred to as "second alarm mark image 620*b*". According to the present embodiment, when only the second alarm level error is occurring, the error notification area 513 displays the second alarm mark image 620*b*. Thus, with the second alarm mark image 620*b* displayed on the home screen 510 (error notification area 513), the worker can visually recognize that only the second alarm level error is occurring to the work machine 1.

When only the second alarm level error is occurring, the third controller 94 determines the background color of the error notification area 513 to be "yellow". Thus, from the background color of the error notification area 513, the worker can visually recognize that only the second alarm level error is occurring to the work machine 1.

When only the second alarm level error is occurring, the third controller 94 causes the first selection item display area 511 to display the second alarm mark image 620*b* as the selection item T2. Thus, displaying the second alarm mark image 620*b* as the selection item T2 causes the worker to visually recognize that only the second alarm level error is occurring to the work machine 1.

Also, the second alarm mark image 620*b* includes a letter string image 621*b* and a graphic image 622*b*. The letter string image 621*b* is placed inside the graphic image 622*b*. The graphic image 622*b*'s outline and the letter string image 621*b* are white, and a color (background color) inside the graphic image 622*b* is yellow.

Figure 7:
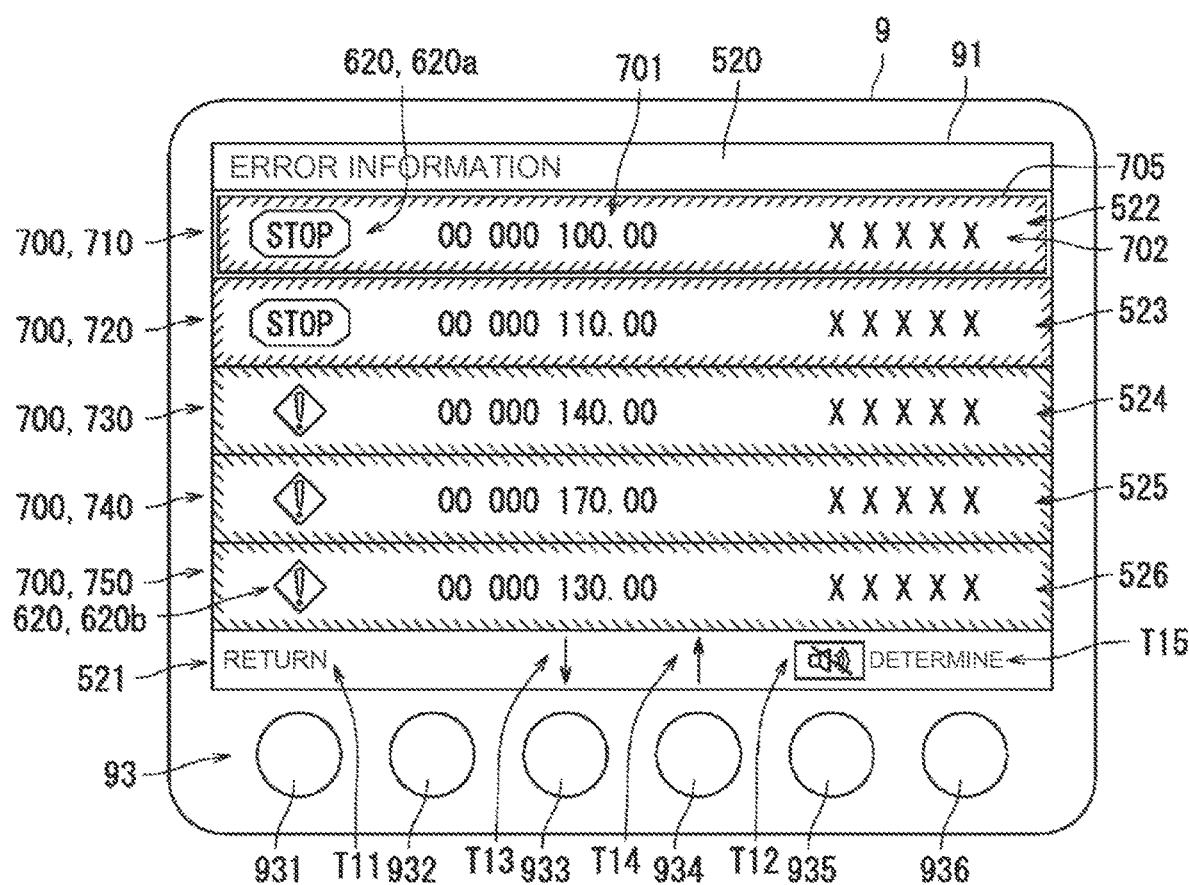
FIG. 7 is a diagram showing the display device displaying an error information screen.

Then, the display device 9 is to be further described with reference to FIGS. 1 to 7. FIG. 7 is a diagram showing the display device 9 displaying the error information screen 520. The error information screen 520 is an example of a second screen. When the selection item T2 described with reference to FIGS. 5 and 6 is selected, the third controller 94 causes the display unit 91 to display the error information screen 520. That is, when the sixth operation switch 936 is pressed down with the selection item T2 being displayed in the first selection item display area 511, the third controller 94 causes the display unit 91 to display the error information screen 520. The error information screen 520 is a screen that shows the error that is occurring to the work machine 1.

As shown in FIG. 7, the error information screen 520 has a second selection item display area 521. The second selection item display area 521 displays various selection items. Specifically, the second selection item display area 521 displays letter images (letter string images) or marks showing various selection items.

In the second selection item display area 521, the selection items T11 and T12 are displayed. The selection item T11 is an item that is selected for returning to the home screen 510. The selection item T12 is an item that is selected for stopping the alarm sound's output.

When the display unit 91 is displaying the error information screen 520, the first operation switch 931 is assigned the function of selecting the selection item T11. That is, to the first operation switch 931, the third controller 94 assigns a function of receiving an instruction for transition from the error information screen 520 to the home screen 510. When, from the error information screen 520, the operation unit 93 receives the instruction for transition to the home screen 510, the third controller 94 causes the display unit 91 to display the home screen 510. Specifically, when the worker presses down the first operation switch 931, the third controller 94 causes the display unit 91 to display the home screen 510. In the following explanation, the transition from the error information screen 520 to the home screen 510, as the case may be, is described as "transition to home screen 510".

When the display unit 91 is displaying the error information screen 520, the fifth operation switch 935 is assigned the function of selecting the selection item T12. That is, to the fifth operation switch 935, the third controller 94 assigns the function of receiving an output stop instruction to stop the alarm sound's output. When the operation unit 93 receives the output stop instruction, the third controller 94 stops the alarm sound's output by the alarm sound output unit 92. Specifically, when the worker presses down the fifth operation switch 935, the third controller 94 stops the alarm sound's output by the alarm sound output unit 92.

In the present embodiment, in the case where the first alarm level error is occurring to the work machine 1; the third controller 94, with the operation unit 93, after having received the output stop instruction, receiving the instruction for transition to the home screen 510, causes the display unit 91 to display the home screen 510, and causes the alarm sound output unit 92 to output the alarm sound. Thus, even when the alarm sound's output is stopped; it is possible, after the screen to be displayed at the display unit 91 is returned to the home screen 510, to cause the worker to recognize again that the first alarm level error is occurring to the work machine 1.

Further, in the present embodiment, in the case where only the second alarm level error is occurring to the work machine 1; when the operation unit 93, after having received the output stop instruction, receives the instruction for transition to the home screen 510, the third controller 94 causes the display unit 91 to display the home screen 510, and maintains the stop of the alarm sound's output. As described with reference to FIG. 5, the second alarm level error is the error due to which the work machine 1 does not need to be stopped; thus, when only the second alarm level error is occurring, the worker may continue the work by the work machine 1.

According to the present embodiment; when the worker, after having instructed for stopping the alarm sound's output, returns the screen, which is displayed at the display unit 91, to the home screen 510 thereby to continue the work by the work machine 1, the worker can do the work without being disturbed by the alarm sound.

Further, in the present embodiment; when the operation unit 93 receives the instruction for transition to the home screen 510, the third controller 94 causes the display unit 91 to display the home screen 510 described with reference to FIG. 5 or the home screen 510 described with reference to FIG. 6. Specifically, in the case where the first alarm level error is occurring to the work machine 1; when the operation unit 93 receives the instruction for transition to the home screen 510, the third controller 94 causes the display unit 91 to display the home screen 510 described with reference to FIG. 5. In the case where only the second alarm level error is occurring to the work machine 1; when the operation unit 93 receives the instruction for transition to the home screen 510, the third controller 94 causes the display unit 91 to display the home screen 510 described with reference to FIG. 6.

Thus, when causing the display unit 91 to display the home screen 510, the third controller 94 causes the first selection item display area 511 to display the selection item T2. As a result, the worker, after the screen to be displayed at the display unit 91 is returned from the error information screen 520 to the home screen 510, can again cause the display unit 91 to display the error information screen 520.

Further, according to the present embodiment, even when the alarm sound's output is stopped when only the second alarm level error is occurring to the work machine 1, the home screen 510 can cause the worker to visually recognize that the error is occurring to the work machine 1.

Then, the display device 9 is to be further described with reference to FIGS. 1 to 7. As shown in FIG. 7, based on the alarm information, the third controller 94 causes the error information screen 520 to display the error information 700. The error information 700 shows the content of the error occurring to the work machine 1. Thus, the worker can easily recognize the content of the error occurring to the work machine 1. Specifically, the error information 700 shows an error code 701, an error name 702, and an alarm mark image 620. The third controller 94 causes the error information screen 520 to display the error code 701, the error name 702, and the alarm mark image 620 in association.

Thus, according to the present embodiment, the worker can be caused to easily recognize the content of the error occurring to the work machine 1. Also, the worker can be caused to easily recognize the alarm level of the error occurring to the work machine 1.

When a plurality of errors is occurring to the work machine 1, the third controller 94 causes the error information screen 520 to display a list of the error information 700. Thus, the worker can easily recognize content of each of the plural errors.

FIG. 7 shows an example of displaying five pieces of error information 700 on the error information screen 520. Specifically, the error information screen 520 displays first error information 710 to fifth error information 750. In detail, the error information screen 520 has a first error information display area 522 to a fifth error information display areas 526. The first error information display area 522 to the fifth error information display area 526 are placed above the second selection item display area 521. The first error information display area 522 to the fifth error information display area 526 are arranged in this order toward the second selection item display area 521. The third controller 94 causes the first error information display area 522 to the fifth error information display area 526 to respectively display the first error information 710 to the fifth error information 750.

In the example shown in FIG. 7, the first error information 710 and the second error information 720 show the first alarm level, and the third error information 730 to the fifth error information 750 show the second alarm level. As shown in FIG. 7, the third controller 94 causes the plural pieces of error information 700 to be displayed according to each alarm level. Thus, according to the present embodiment, the worker can be caused to easily recognize the alarm level of the error occurring to the work machine 1. In the order of occurrence of the error, the third controller 94 arranges the plural pieces of error information 700 with the same alarm level. In the example shown in FIG. 7, the first error information 710 and the second error information 720 are arranged in the order of occurrence of the error. The third error information 730 to the fifth error information 750 are similarly arranged in the order of occurrence of the error.

Further, as shown in FIG. 7, the third controller 94 causes the error information 700 showing the first alarm level to be displayed at the upper step of the error information 700 showing the second alarm level. That is, the third controller 94 causes the error information 700 with the higher alarm level to be displayed at the upper step of the error information 700 with the lower alarm level. Thus, the third controller 94 causes the plural pieces of error information 700 in a descending order from the error information 700 with the higher alarm level. Thus, according to the present embodiment, the worker can be caused to easily recognize the alarm level of the error occurring to the work machine 1.

Further, based on the alarm level shown by the error information 700 to be displayed in the first error information display area 522 to the fifth error information display area 526, the third controller 94 determines the background colors of the first error information display area 522 to the fifth error information display area 526.

For example, the third controller 94 determines the background color of the area, which displays the error information 700 showing the first alarm level, to be red, and the background color of the area, which displays the error information 700 showing the second alarm level, to be yellow. In the example shown in FIG. 7, the background colors of the first error information display area 522 and the second error information display area 523 are red, and the background colors of the third error information display area 524 to the fifth error information display area 526 are yellow.

In this way, the background colors of the first error information display area 522 to the fifth error information display area 526 are changed according to the alarm level shown by the error information 700 displayed in the first error information display area 522 to the fifth error information display area 526, making it possible to cause the worker to easily recognize the alarm level of the error occurring to the work machine 1. The first error information display area 522 to the fifth error information display area 526 are an example of partitioned areas.

Then, the display device 9 is to be further described with reference to FIGS. 1 to 7. As shown in FIG. 7, the third controller 94 causes the error information screen 520 to display a cursor 705. The cursor 705 designates the error information 700. In the example shown in FIG. 7, the first error information 710 is designated by the cursor 705.

Also, as shown in FIG. 7, the second selection item display area 521 further displays a selection item T13, a selection item T14, and a selection item T15. The selection item T13 is an item that is selected when moving the cursor 705 downward. The selection item T14 is an item that is selected when moving the cursor 705 upward. The selection item T15 is an item that is selected when displaying the error information detail screen 530 described with reference to FIG. 8.

When the display unit 91 is displaying the error information screen 520, the third operation switch 933 is assigned the function of selecting the selection item T13. Thus, when the worker presses down the third operation switch 933, the third controller 94 moves the cursor 705 to a position one step lower.

When the display unit 91 is displaying the error information screen 520, the fourth operation switch 934 is assigned the function of selecting the selection item T14. Thus, when the worker presses down the fourth operation switch 934, the third controller 94 moves the cursor 705 to a position one step higher.

When the display unit 91 is displaying the error information screen 520, the sixth operation switch 936 is assigned the function of selecting the selection item T15. Thus, when the worker presses down the sixth operation switch 936, the third controller 94 causes the screen, which is to be displayed at the display unit 91, to transition from the error information screen 520 to the error information detail screen 530 described with reference to FIG. 8. In detail, the third controller 94, with the sixth operation switch 936 pressed down, causes the display unit 91 to display the screen showing detail of the error information 700 designated by the cursor 705.

Figure 8:
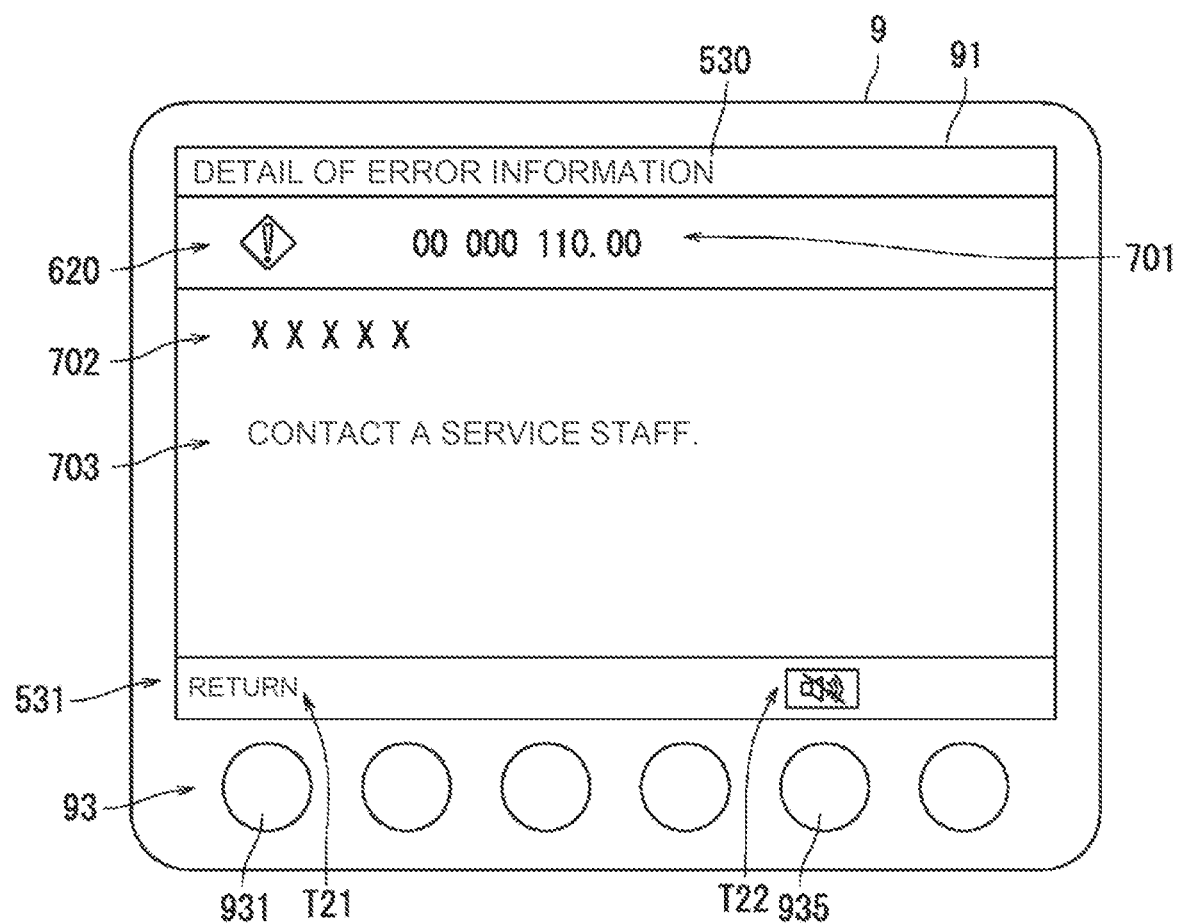
FIG. 8 is a diagram showing the display device displaying an error information detail screen.

Then, the display device 9 is to be further described with reference to FIGS. 1 to 8. FIG. 8 is a diagram showing the display device 9 displaying the error information detail screen 530. As shown in FIG. 8, based on the alarm information, the third controller 94 causes the display unit 91 to display the error information detail screen 530.

The error information detail screen 530 displays an alarm mark image 620, an error code 701, an error name 702, and a message 703. The message 703 is a letter string image that shows the method of dealing with the error.

The error information detail screen 530 has a third selection item display area 531. The third selection item display area 531 displays various selection items. Specifically, the third selection item display area 531 displays letter images (letter string images) or marks showing various selection items.

The third selection item display area 531 displays a selection item T21 and a selection item T22. The selection item T21 is an item that is selected when returning to the error information screen 520. Selection item T22 is an item that is selected when stopping the alarm sound's output.

When the display unit 91 is displaying the error information detail screen 530, the first operation switch 931 is assigned the function of selecting the selection item T21. Thus, when the worker presses down the first operation switch 931, the third controller 94 causes the display unit 91 to display the error information screen 520.

When the display unit 91 is displaying the error information detail screen 530, the fifth operation switch 935 is assigned the function of selecting the selection item T22. Thus, when the worker presses down the fifth operation switch 935, the third controller 94 stops the alarm sound's output by the alarm sound output unit 92.

Figure 9:
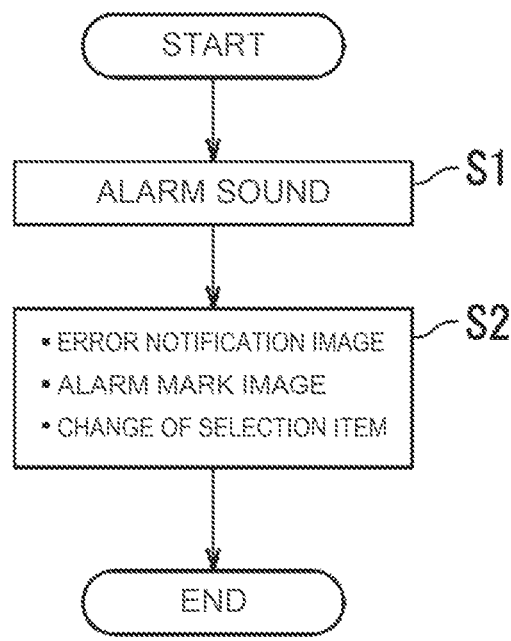
FIG. 9 is a flowchart showing a process executed by a third controller in the display device.

Then, the process executed by the third controller 94 is to be described with reference to FIGS. 1 to 9. FIG. 9 is a flowchart showing a process executed by the third controller 94 in the display device 9. Specifically, FIG. 9 shows the process executed by the third controller 94 after the alarm information is sent from the first controller 11 to the third controller 94.

As shown in FIG. 9, when receiving the alarm information from the first controller 11, the third controller 94 executes the processes of steps S1 and S2.

First, based on the alarm information, the third controller 94 causes the alarm sound output unit 92 to output the alarm sound (step S1).

Next, based on the alarm information, the third controller 94 causes the error notification area 513 of the home screen 510 to display the error notification image 610 (step S2).

Also, based on the alarm information, the third controller 94 causes the error notification area 513 of the home screen 510 to display the alarm mark image 620 (step S2). Specifically, the third controller 94, when the alarm level shown by the alarm information is the first alarm level, causes the first alarm mark image 620a to be displayed, and when the alarm level shown by the alarm information is the second alarm level, causes the second alarm mark image 620b to be displayed. When the first alarm level error occurs, the third controller 94 causes the first alarm mark image 620a to be displayed until the error is resolved.

Also, the third controller 94 changes, to the selection item T2, one of the selection items displayed in the first selection item display area 511 (step S2), and ends the processes shown in FIG. 9. In the present embodiment, the third controller 94 changes the selection item T1 to the selection item T2.

Figure 10:
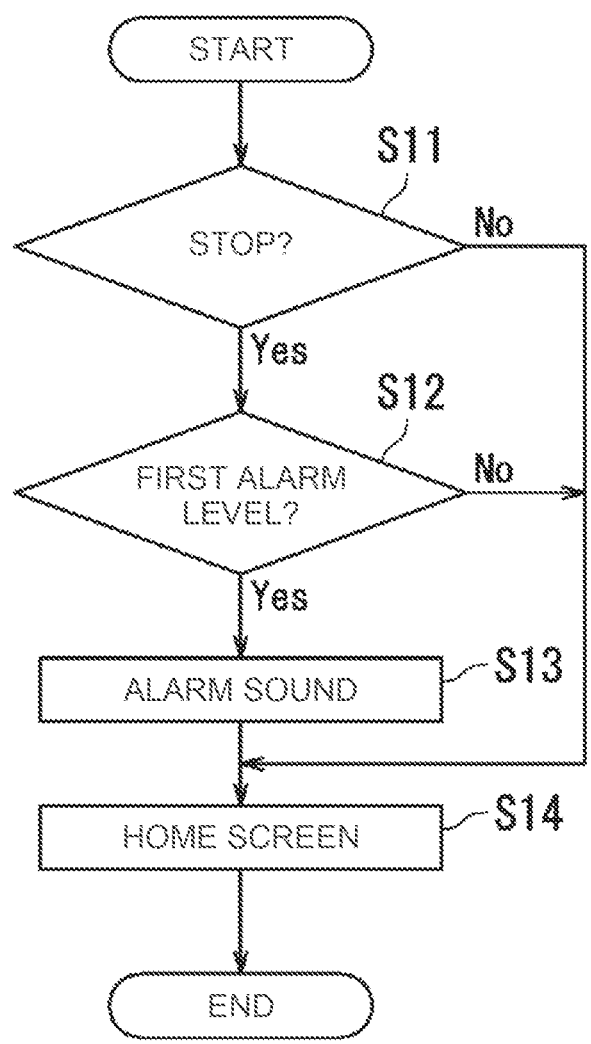
FIG. 10 is a flowchart showing another process executed by the third controller in the display device.

Then, other processes executed by the third controller 94 are to be described with reference to FIGS. 1 to 10. FIG. 10 is a flowchart showing other processes executed by the third controller 94 in the display device 9. Specifically, FIG. 10 shows the processes executed by the third controller 94 after the selection item T11 is selected during the displaying of the error information screen 520. That is, FIG. 10 shows the processes executed by the third controller 94 after the first operation switch 931 is pressed down when the error information screen 520 is displayed at the display unit 91.

As shown in FIG. 10, when the first operation switch 931 is pressed down when the error information screen 520 is displayed at the display unit 91, the third controller 94 determines whether or not the alarm sound's output is stopped (step S11).

When determining that the alarm sound's output is stopped (step S11 Yes), the third controller 94 determines, based on the alarm information, whether or not the alarm level of the error occurring to the work machine 1 includes the first alarm level (step S12). Further, the third controller 94 stores the alarm information received from the first controller 11.

When determining that the alarm level of the error occurring to the work machine 1 includes the first alarm level (step S12 Yes), the third controller 94 causes the alarm sound output unit 92 to output the alarm sound (step S13), and causes the display unit 91 to display the home screen 510 (step S14). Upon causing the display unit 91 to display the home screen 510, the third controller 94 ends the processes shown in FIG. 10.

Meanwhile, when determining that the alarm sound's output has not stopped (No in step S11), the third controller 94 causes the display unit 91 to display the home screen 510 (step S14), and ends the processes shown in FIG. 10.

When determining that the alarm level of the error occurring to the work machine 1 does not include the first alarm level (step S12 No), the third controller 94 causes the display unit 91 to display the home screen 510 (step S14), and ends the processes shown in FIG. 10.

As described above with reference to FIGS. 1 to 10, according to the present embodiment; whether the alarm level is the first or second alarm level, the operation unit 93 can receive the output stop instruction. Thus, regardless of the type of error, the alarm sound's output can be stopped.

The embodiment of the present invention has been described with reference to the accompanying drawings (FIGS. 1 to 10). However, the present invention is not limited to the above embodiment, and can be executed in various aspects in the range without departing from its spirit. The plurality of components disclosed in the above embodiment may be properly modified. For example, one of all the components shown in one embodiment may be added to the component of the other embodiment, or some components of all the components shown in one embodiment may be removed from the embodiment.

The drawings schematically show each component as a main subject as so to facilitate understanding of the invention, and the thickness, length, quantity, spacing, and the like of each shown component is, as the case may be, different from the actual ones due to the convenience of creating the drawings. Further, it is needless to say that the configuration of each component shown in the above embodiment is merely an example and is not particularly limited, and various modifications can be made without substantially departing from the effect of the present invention.

For example, in the embodiment described with reference to FIGS. 1 to 10; in the case where only the second alarm level error is occurring, after the alarm sound's output is stopped, when the screen to be displayed at the display unit 91 is caused to transition from the error information screen 520 to the home screen 510, the third controller 94 maintained the output stop of the alarm the sound; but as in the case where the first alarm level error is occurring, the third controller 94 may output the alarm sound.

In the embodiment described with reference to FIGS. 1 to 10, the work machine 1 was a backhoe, but the work machine 1 is not limited to the backhoe. The work machine 1 may be any machine as long as being provided with a display device that controls the alarm sound output unit.

Also, in the embodiment described with reference to FIGS. 1 to 10, the operation unit 93 included a plurality of operation switches (first operation switch 931 to sixth operation switch 936), but the operation unit 93 is not limited to the plurality of operation switches. For example, the operation unit 93 may include a touch sensor. The touch sensor may be superimposed on a display face of the display unit 91. Or, the operation unit 93 may include a jog dial.

Also, in the embodiment described with reference to FIGS. 1 to 10, the third controller 94 executed the processes shown in FIGS. 9 and 10, the first controller 11 may execute the processes shown in FIGS. 9 and 10, or the first controller 11 and the third controller 94 in cooperation may execute the processes shown in FIGS. 9 and 10.

Figure 11:
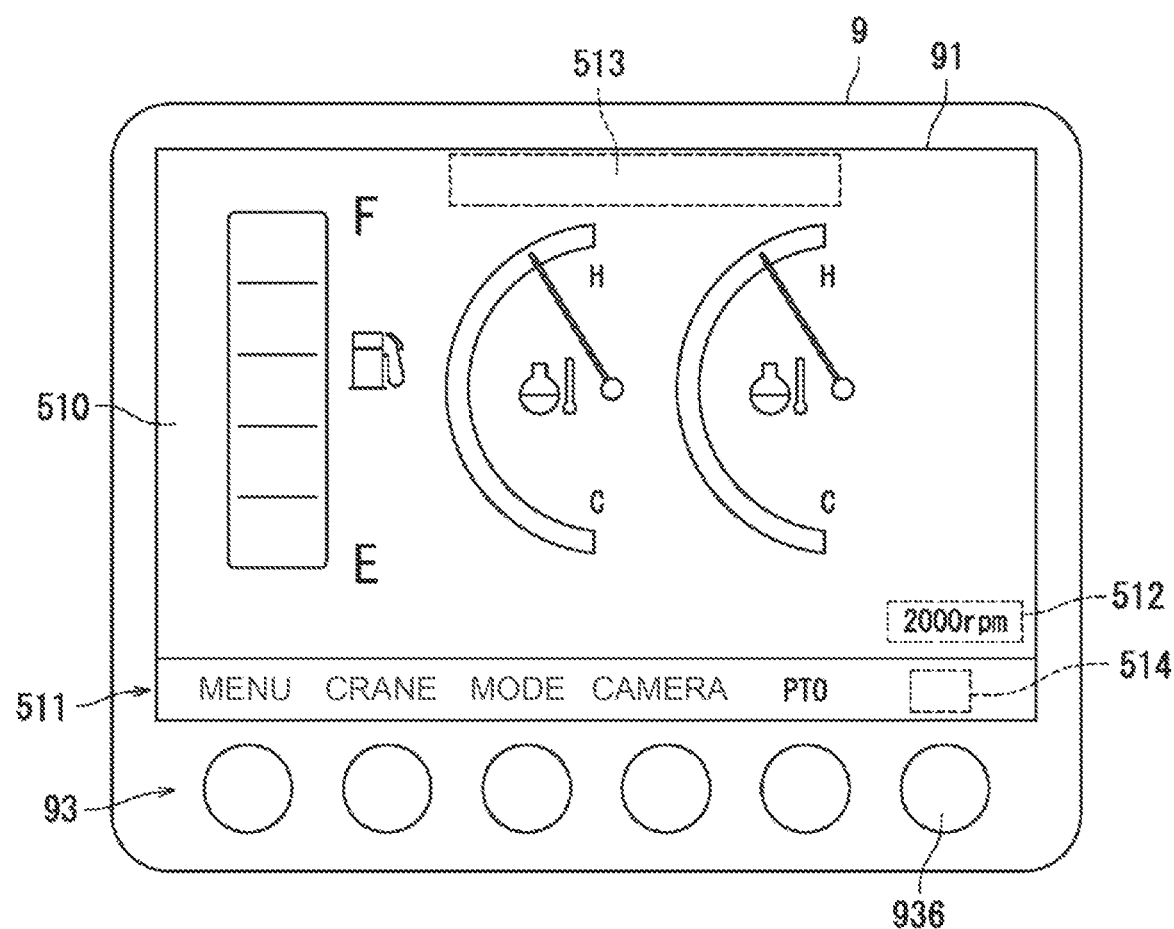
FIG. 11 is a diagram showing a modified example of the display device according to the embodiment of the present invention.

Also, in the embodiment described with reference to FIGS. 1 to 10, the third controller 94 changed, to the selection item T2, one of the selection items displayed in the first selection item display area 511, but as shown in FIG. 11, a specific area 514 for displaying the selection item T2 may be provided in the first selection item display area 511.

The following is a modified example of the display device 9 of the present embodiment, with reference to FIG. 11. FIG. 11 shows the modified example of the display device 9 of the present embodiment. In detail, FIG. 11 shows the modified example of the home screen 510 that is displayed by the display device 9 before the alarm information is sent from the first controller 11 to the third controller 94.

The home screen 510 shown in FIG. 11 has the specific area 514 in the first selection item display area 511. When the first controller 11 has not detected the occurrence of the error, no selection item is displayed in the specific area 514. When receiving the alarm information from the first controller 11, the third controller 94 causes the specific area 514 to display the selection item T2.

INDUSTRIAL APPLICABILITY

The present invention is useful for a display device and a work machine.

DESCRIPTION OF REFERENCE NUMERALS 1 work machine
9 display device
91 display unit
92 alarm sound output unit
93 operation unit
94 third controller
510 home screen
511 first selection item display area
513 second notification area (error notification area)
520 error information screen
521 second selection item display area
522 first error information display area
523 second error information display area
524 third error information display area
526 fifth error information display area
610 error notification image
620 alarm mark image
620a first alarm mark image
620b second alarm mark image
700 error information
T2 selection item
T11 selection item
T12 selection item

The invention claimed is:

1. A display device comprising:
a display unit configured to display a first screen;
a control unit that is configured to, based on alarm information, cause the first screen to display an image that shows that an error is occurring;
an alarm sound output unit configured to output an alarm sound based on the alarm information; and
a reception unit configured to receive a first instruction that indicates a transition to a second screen that shows a content of the error,
wherein:
the control unit is further configured to, when the reception unit receives the first instruction, cause the display unit to display the second screen,
the control unit is further configured to, with the display unit displaying the second screen, assign, to the reception unit, a function of receiving an output stop instruction that indicates an instruction to stop the alarm sound's output and a function of receiving a second instruction that indicates an instruction of a transition from the second screen to the first screen,
the control unit is further configured to, with the reception unit receiving the output stop instruction, stop the alarm sound's output by the alarm sound output unit, and
the control unit is further configured to, when the reception unit receives the second instruction after having received the output stop instruction, cause the display unit to display the first screen, and cause the alarm sound output unit to output the alarm sound.

2. The display device according to claim 1, wherein:
the alarm information includes information that shows an alarm level set for the error,
the alarm level includes a first alarm level and a second alarm level,
in a case where the alarm level set for the error is the first alarm level, the control unit is configured to, when the reception unit receives the second instruction after having received the output stop instruction, cause the display unit to display the first screen, and cause the alarm sound output unit to output the alarm sound, and
in a case where the alarm level set for the error is the second alarm level, the control unit is configured to, when the reception unit receives the second instruction after having received the output stop instruction, cause the display unit to display the first screen, and maintain the stop of the alarm sound's output.

3. The display device according to claim 1, wherein the first screen includes a selection item display area that displays a selection item,
the reception unit is configured to receive an instruction for selecting the selection item, and
the control unit is configured to, based on the alarm information, cause the selection item display area to display, as the selection item, an item that corresponds to the first instruction.

4. The display device according to claim 3, wherein the item that corresponds to the first instruction includes an alarm mark image that shows that the error is occurring.

5. The display device according to claim 4, wherein:
the alarm information includes information that shows an alarm level set for the error, the alarm level includes a first alarm level and a second alarm level, the alarm mark image includes a first alarm mark image that corresponds to the first alarm level, and a second alarm mark image that corresponds to the second alarm level, and the control unit is configured to, according to the alarm level set for the error, cause the selection item display area to display the first alarm mark image or the second alarm mark image.

6. The display device according to claim 3, wherein the control unit is configured to, when the reception unit receives the second instruction, cause the display unit to display the first screen, and cause the selection item display area to display an item that corresponds to the first instruction.

7. The display device according to claim 1, wherein, in a case where a plurality of errors are occurring, the control unit is configured to cause the second screen to display a list of respective contents of the plural errors.

8. The display device according to claim 7, wherein:
any one of plural alarm levels is set for each of the plural errors, and
the control unit is configured to cause the second screen to display the contents of the plural errors, by grouping the contents into respective alarm levels.

9. The display device according to claim 7, wherein:
for each of the plural errors, any one of the plural alarm levels is set, and
the control unit is configured to, based on the alarm level set for each of the plural errors, cause the contents of the plural errors to be displayed in a descending order.

10. The display device according to claim 1, wherein:
the second screen includes a partitioned area that displays a content of the error,
the alarm information includes information that shows an alarm level set for the error, and
the control unit is configured to, based on the alarm level set for the error, determine a background color of the partitioned area.

11. The display device according to claim 1, wherein the alarm information includes information that shows an alarm level set for the error, and
the control unit is configured to cause the second screen to display an alarm mark image that shows the alarm level set for the error.

12. A work machine comprising:
a display device according to claim 1; and
a sending unit configured to send the alarm information to the display device.

13. A display device comprising:
a display unit configured to display a first screen;
a control unit that is configured to, based on alarm information, cause the first screen to display an image that shows that an error is occurring;
an alarm sound output unit configured to output an alarm sound based on the alarm information; and
a reception unit configured to receive a first instruction that indicates a transition to a second screen that shows a content of the error,
wherein:
the control unit is further configured to, when the reception unit receives the first instruction, cause the display unit to display the second screen,
the control unit is further configured to, with the display unit displaying the second screen, assign, to the reception unit, a function of receiving an output stop instruction that indicates an instruction to stop the alarm sound's output and a function of receiving a second instruction that indicates an instruction of a transition from the second screen to the first screen, the control unit is further configured to, with the reception unit receiving the output stop instruction, stop the alarm sound's output by the alarm sound output unit, the control unit is further configured to, when the reception unit receives the second instruction after having received the output stop instruction, cause the display unit to display the first screen, and cause the alarm sound output unit to output the alarm sound, the control unit is further configured to, in a case where a plurality of errors are occurring, cause the second screen to display a list of respective contents of the plural errors, wherein any one of plural alarm levels is set for each of the plural errors, and the control unit is further configured to cause the second screen to display the contents of the plural errors, by grouping the contents into respective alarm levels.

14. A work machine comprising:
a display device according to claim 13; and
a sending unit configured to send the alarm information to the display device.

15. A display device comprising:
a display unit configured to display a first screen;
a control unit that is configured to, based on alarm information, cause the first screen to display an image that shows that an error is occurring;
an alarm sound output unit configured to output an alarm sound based on the alarm information; and
a reception unit configured to receive a first instruction that indicates a transition to a second screen that shows a content of the error,
wherein:
the control unit is further configured to, when the reception unit receives the first instruction, cause the display unit to display the second screen,
the control unit is further configured to, with the display unit displaying the second screen, assign, to the reception unit, a function of receiving an output stop instruction that indicates an instruction to stop the alarm sound's output and a function of receiving a second instruction that indicates an instruction of a transition from the second screen to the first screen, the control unit is further configured to, with the reception unit receiving the output stop instruction, stop the alarm sound's output by the alarm sound output unit, the control unit is further configured to, when the reception unit receives the second instruction after having received the output stop instruction, cause the display unit to display the first screen, and cause the alarm sound output unit to output the alarm sound, the second screen includes a partitioned area that displays a content of the error, the alarm information includes information that shows an alarm level set for the error, and the control unit is further configured to, based on the alarm level set for the error, determine a background color of the partitioned area.

16. A work machine comprising:
a display device according to claim 15; and a sending unit configured to send the alarm information to the display device.

\* \* \* \* \*